UNITED STATES PATENT OFFICE.

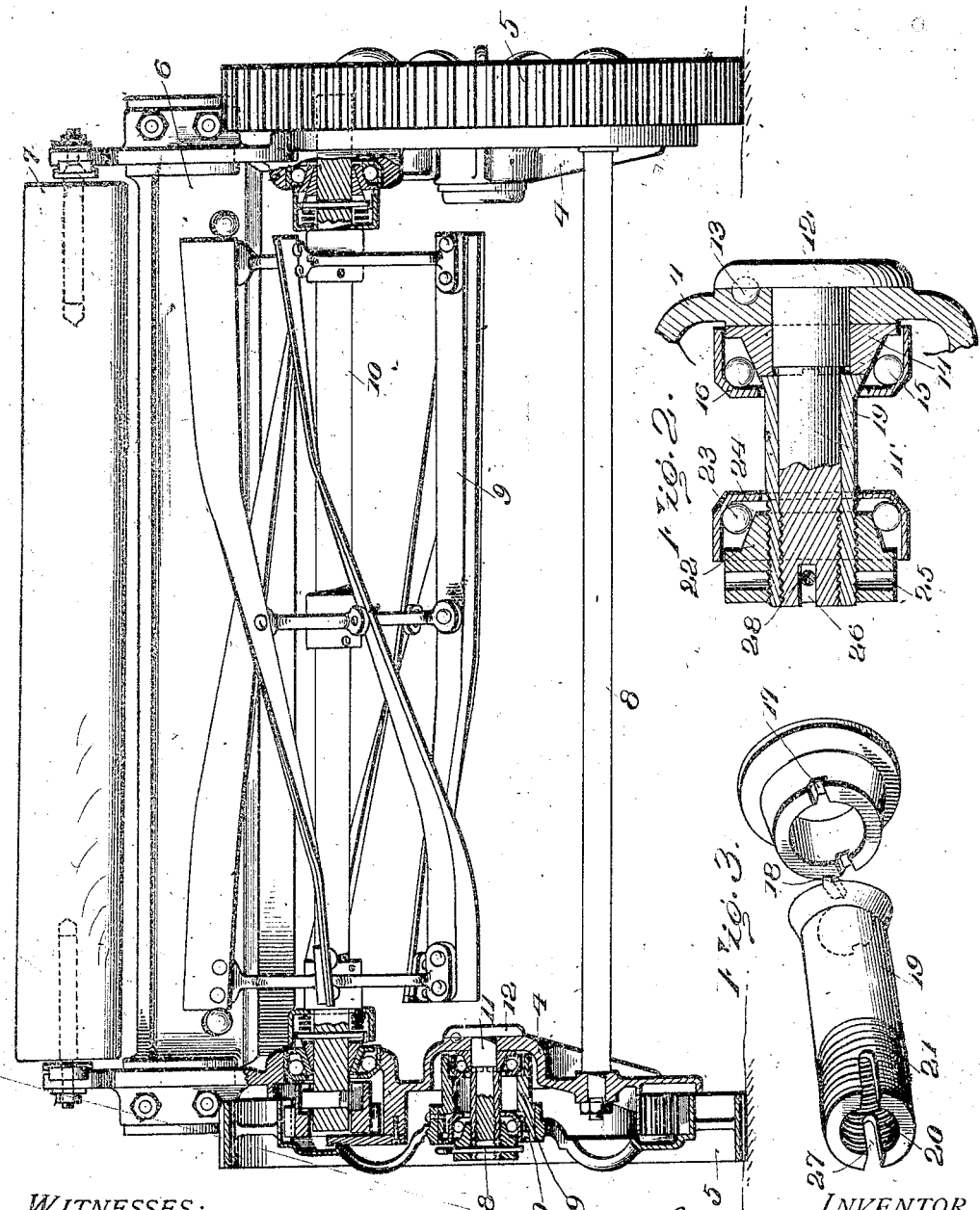

LEVI BROWN, OF RICHMOND, INDIANA, ASSIGNOR TO JOHN M. LONTZ, OF RICHMOND, INDIANA.

WHEEL-MOUNTING.

1,123,236.  Specification of Letters Patent.  Patented Jan. 5, 1915.

Original application filed April 24, 1911, Serial No. 622,992. Divided and this application filed October 5, 1911. Serial No. 652,940.

*To all whom it may concern:*

Be it known that I, LEVI BROWN, of Richmond, Indiana, have invented a new and useful Improvement in Wheel-Mountings, which invention is fully set forth in the following specification.

The present invention is an improvement in the mounting of wheels, and is particularly adapted to the mounting of the ground wheels of lawn mowers.

This application is a division of application Serial No. 622,992, filed April 24, 1911.

It has heretofore been experienced in connection with lawn mowers, that the severe usage to which machines of this character are subject has resulted in the loosening of the connections of the ground wheels to the side frames, with the result that said frames have been subject to increased strain and racking.

The improved mounting which forms the subject-matter of the present invention so connects the ground wheels to the side frames of the machine as to insure practical rigidity between these parts.

The invention will be better understood by reference to the accompanying drawings which illustrate one embodiment of the inventive idea, and wherein, Figure 1 is a top plan view, partly in section, of a lawn mower provided with the improved mounting for the ground wheels; Fig. 2 is an enlarged sectional view, partly in elevation, illustrating the means for rigidly mounting a ground wheel to one of the side frames of the machine; and Fig. 3 is an enlarged perspective view of the sleeve and cone member shown in section in Fig. 2.

Referring to the drawings, 4, 4, indicate two side frames of the machine on which are mounted any suitable ground wheels 5, stationary knife 6 and roller 7, said side frames being connected together by rod 8. The shaft for the rotary cutter blades 9 is indicated by 10.

As heretofore stated, the means for mounting the ground wheels 5 of side frames 4 have for their primary object to effectively and rigidly connect the ground wheels to said side frames. To this end a bolt 11, which is screw-threaded at one end, passes through each side frame and is connected to the ground wheel by the means hereafter described. This bolt has a head 12 which is provided with a depression in which a suitable projection 13 on the side frame 4 is adapted to engage to position said bolt. A cone 14 engages around an enlarged part of said bolt 11, and the tapered face of this cone constitutes the bearing surfaces for the balls 15 carried in the ball holder 16. This cone is provided with a plurality of recesses 17, preferably diametrically arranged, in which engage projections 18 provided on a hollow sleeve 19. This hollow sleeve is provided with internal screw-threads 20 and external screw-threads 21 provided at one end thereof. A screw-threaded cone 22 engages the screw-threads 21 on said hollow sleeve, and is provided with a tapered surface which forms a bearing for the balls 23 carried by the holder 24. This cone member 22 is provided with a plurality of transverse perforations 25 which are adapted to be brought into alinement with a slot 26 arranged in the end of bolt 11 and slots 27 provided in the end of hollow sleeve 19. When the ground wheel 5 is secured to the appropriate side frame 4, a pin 28 is passed through the perforation in the cone member 22 which is in alinement with the slots in the bolt and hollow sleeve, and thus the parts are held fixedly in position. In assembling these parts, the bolt 11 is first passed through the side frame 4 and the depression in the head 12 is engaged with the projection 13 on said side frame. The cone 14 is then slipped over the bolt 11 and into the position shown in Fig. 2, after which the hollow sleeve 19 is screwed onto the bolt 11, the internal screw-threads 20 of said hollow sleeve engaging the screw-threads on said bolt. When said sleeve has been screwed down so that the projections 18 thereon are in close proximity to the recesses 17 in the cone member 14, said sleeve is sprung so that said projections 18 engage the recesses 17. The continued rotation of the sleeve 19 then results in the simultaneous rotation of the cone 14 and, as will be appreciated, this rotation will act to fixedly clamp the bolt 11 to the side frame 4 and also to tightly bind said side frame, bolt 11, sleeve 19 and the cone 14 together. The balls 15 carried by the ball holder 16 are then engaged with the cone 14, after which the ground wheel 5 is placed in the position shown in Fig. 1, a flange 29 carried by said wheel engaging the ball holder 16. This flange is provided with a socket 30 which is adapted to engage the holder 24, carrying the balls 23. After this holder is placed in position, the cone 22 is screwed on to the sleeve 19 until it is in proper position for the passing of the pin 28 through the alined slots in bolt 11 and sleeve 19, and one of the perforations 25 in said cone. When the parts are thus secured together, the ground wheels will be rigidly and securely held to the side frames 4 and under all conditions of usage, it will be found practically impossible to loosen the ground wheels from said side frames.

Any wear of the wheel bearings that may occur during the life of the mower may be taken up by removing pin 28 and tightening cone 22, and then passing pin 28 through slots 26 and 27 and the perforation in cone 22 which is in alinement therewith.

While the improved wheel mounting has been herein described with particular reference to lawn mowers, it will be understood that it may be used generally for the mounting of wheels.

What is claimed is:—

1. In a bearing, the combination of a frame, a rotary element, means for connecting said rotary element to said frame comprising a bolt, an element encircling said bolt and engaging said frame, a sleeve encircling said bolt and engaging said element, said sleeve and bolt having a screw-thread connection whereby rotation of said sleeve will tighten said bolt on said frame, and a bearing element encircling said sleeve.

2. In a wheel mounting, a frame, a rotary element, a bolt projecting through said frame, a sleeve engaging over said bolt, a second element engaging over said bolt, said sleeve and element being provided with connecting means and said sleeve and bolt being provided with screw-threads whereby the rotation of said sleeve will tighten said bolt in position, a bearing element provided on said sleeve, and means for securing said bolt, sleeve and elements in their fixed position.

3. In a wheel mounting, a frame, a rotary element, a bolt projecting through said frame, a sleeve engaging over said bolt, a cone encircling said bolt and engaging said sleeve and frame, said sleeve and bolt being provided with screw-threads whereby the rotation of said sleeve will tighten said bolt in position, a second cone provided on said sleeve and means for securing said bolt, sleeve and cones in their fixed position.

4. In a wheel mounting, a frame, a rotary element, a bolt projecting through said frame, means preventing the rotation of said bolt, a sleeve engaging over said bolt, a second element engaging over said bolt, said sleeve and element being provided with connecting means and said sleeve and bolt being provided with screw-threads whereby the rotation of said sleeve will tighten said bolt in position, and means for securing said bolt, sleeve and element in their fixed position.

5. In a wheel mounting, a frame, a rotary element, a bolt projecting through said frame, a sleeve engaging over said bolt, a cone encircling said bolt and engaging said sleeve and frame, said sleeve and bolt being provided with screw-threads whereby the rotation of said sleeve will tighten said bolt in position, a cone adjustable on said sleeve, and means for securing said bolt, sleeve and cones in their fixed position.

In testimony whereof I have signed this specification in the presence of two subscribing witnesses.

LEVI BROWN.

Witnesses:
H. R. LONTZ,
B. T. HILL.